(12) United States Patent
Tsuge

(10) Patent No.: US 7,421,909 B2
(45) Date of Patent: Sep. 9, 2008

(54) ROTATION DETECTOR AND METHOD FOR PRODUCING THE SAME

(75) Inventor: Hiroyuki Tsuge, Nisshin (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 11/434,077

(22) Filed: May 16, 2006

(65) Prior Publication Data

US 2006/0260418 A1    Nov. 23, 2006

(30) Foreign Application Priority Data

May 20, 2005    (JP) .............................. 2005-147806

(51) Int. Cl.
 *G01L 3/00*    (2006.01)
(52) U.S. Cl. .................................. 73/862.08
(58) Field of Classification Search ............... 73/862.08
 See application file for complete search history.

(56) References Cited

U.S. PATENT DOCUMENTS 6,157,186 A * 12/2000 Aoki et al. ................... 324/174
6,392,405 B1 * 5/2002 Nishizaki et al. ............ 324/173
6,779,389 B2 * 8/2004 Kubota et al. ............... 73/118.1
6,844,719 B2 * 1/2005 Tsuge et al. ................. 324/174
6,879,151 B2 * 4/2005 Iwase et al. ............. 324/207.25
7,042,212 B2 * 5/2006 Yoshikawa et al. ..... 324/207.25
7,155,984 B2 * 1/2007 Fujita et al. .............. 73/862.08
7,190,160 B2 * 3/2007 Hattori .................. 324/207.25
2005/0126308 A1    6/2005 Tsuge et al.

FOREIGN PATENT DOCUMENTS

JP    A-2000-171475    6/2000
JP    A-2005-227177    8/2005

* cited by examiner

*Primary Examiner*—Edward Lefkowitz
*Assistant Examiner*—Octavia Davis
(74) *Attorney, Agent, or Firm*—Posz Law Group, PLC

(57) ABSTRACT

A rotation detector having a Hall IC in a case-shape housing includes a wiring extending therefrom in a direction of a bent portion of a detector body in accordance with one of plural predetermined directions of a position pin defined by pin receivers when the detector body is molded by using a mold having the position pin.

9 Claims, 13 Drawing Sheets

LEFT SIDE

RIGHT SIDE

ARRANGEMENT OF HALL ELEMENT
=ROTATION OF GEAR ROTOR

ARRANGEMENT OF HALL ELEMENT
=ROTATION OF GEAR ROTOR

ROTATION DETECTOR AND METHOD FOR PRODUCING THE SAME

CROSS REFERENCE TO RELATED APPLICATION

This application is based on and claims the benefit of priority of Japanese Patent Application No. 2005-147806 filed on May 20, 2005, the disclosure of which are incorporated herein by reference.

FIELD OF THE INVENTION

The present invention generally relates to a method for producing a rotation angle detector.

BACKGROUND OF THE INVENTION

Conventionally, rotation of a tire is detected by using a rotation detector designed for detecting the rotation of the tire as disclosed in Japanese patent document JP-A-2000-171475. The rotation detector as a tire speed sensor J1 detects a rotation angle of a tire by using a magnetic sensor such as Hall element, a rotating gear rotor J3 that represents rotation of a drive shaft J2, a magnet for magnetizing the rotor J3 and a processing circuit for processing an output signal from the magnetic sensor as shown in FIGS. 9A and 9B. The tire speed sensor J1 is disposed, for example, to oppose the gear rotor J3 fixed on the drive shaft J2 that drives the tire as shown in FIG. 9A.

The magnetism (direction of magnetic flux) from the magnet changes as teeth on the gear rotor J3 are driven by rotation of the gear shaft J2, because the teeth of the rotor J3 run through the magnetic flux that flows from the magnet toward the magnetic sensor. The change of the magnetic flux detected by the magnetic sensor is sent to the processing circuit as an output signal, and the output signal is converted to a pulse signal that represents a number of teeth that passed the magnetic flux. In this manner, the rotation of the tire is detected by using the pulse signal for use in, for example, a brake ECU or the like.

The tire speed sensor J1 has a wire J7 for outputting the pulse signal processed in the processing circuit, and the wire J7 extends in an axial direction (upwardly) from a sensor body J5 that houses the magnetic sensor, the magnet and the processing circuit for outputting as shown in FIG. 9A.

However, the wire J7 extending in the axial direction of the sensor body J5 interferes with a vehicle body or other parts disposed thereon because of a limitation of a space reserved for the sensor J1. That is, the wire J7 interferes, for example, with a suspension arm, a brake dust cover or the like.

In this case, the wire J7 of the sensor J1 has to be bent and extended perpendicularly against the axis of the sensor body J5 as shown in FIG. 9B.

Rotation speed of the tire is detected by using the same tire speed sensors J1 respectively disposed on both of the right side tire and the left side tire of a vehicle. However, the sensor J1 on the right side tire and the left side tire have to be in a different shape in spite of the symmetrical arrangement of the sensors J1 on the vehicle. This is because of the restriction on the arrangement of the magnetic sensor element against the rotation direction of the gear rotor J3. In other words, a stay for installation of the sensor J1 has different angles against the sensor body respectively for the sensor on the right side and the sensor on the left side.

FIGS. 10A and 10B shows illustrations of positional relationship between magnetic sensors J4 and the gear rotor J3.

FIG. 11 shows a diagram that represents a relationship of a maximum amount of an air gap between the sensor body J5 and the gear rotor J3 against an arrangement angle of the sensors J4.

The magnetic sensors J4 are, for example, an arrangement of two Hall elements J4a, J4b. The sensor body J5 is disposed in such a manner that the arrangement of the two Hall elements J4a, J4b aligns with the rotation direction of the gear rotor J3. The rotation direction of the gear rotor J3 is perpendicular to a rotation axis in FIG. 10A.

The arrangement of the two Hall elements J4a, J4b may slightly be diverted from the rotation direction of the gear rotor J3 because of an assembly error or the like. The error of assembly in angle is expressed as θ, and the relationship between the error and the maximum air gap is shown in FIG. 11. As shown in the diagram in FIG. 11, the maximum air gap decreases as the error angle θ increases.

On the other hand, an air gap between the sensor body J5 and a top of the teeth of the gear rotor J3 must be greater than a predetermined value when a certain amount of the assembly error is expected in the course of assembly of the sensor body J5. Therefore, the predetermined value of the air gap defines a minimum amount of the air gap against a curve of the relationship between the maximum air gap and the error angle, thereby determining a range of the error angle θ.

FIG. 12A shows an illustration of a positional relationship between a stay J6 and the sensor body J5, and FIG. 12B shows an illustration of an arrangement of the tire speed sensor disposed on the right and left tires.

As shown in FIG. 12A, the stay J6 on the sensor body J5 has a certain angle against the arrangement of the two Hall elements J4a, J4b. That is, the stay J6 is not arranged perpendicularly to the two Hall elements J4a, J4b, but has a certain angle against the two Hall elements J4a, J4b. Further, the wire J7 extends toward an opposite side to the stay J6.

Therefore, the tire speed sensor J1 for use with a right tire is, for example, suitably used for the right tire as shown in FIG. 12A, that is, the arrangement of the two Hall elements J4a, J4b aligns with the rotation direction of the gear rotor J3 when the speed sensor J1 is disposed on a position that corresponds to the right tire. However, the same speed sensor J1 for use with a right tire cannot be suitably used for the left tire because of a restriction on the error angle. That is, the arrangement of the two Hall elements J4a, J4b does not fall within the range of the angle described above with reference to the diagram in FIG. 11 because the range of the error angle is very small on account of assembly error incorporated thereto.

As a result, the stay J6 of the tire speed sensor J1 has to have respectively different angles against the sensor body J5 for use with the right tire and with the left tire.

Japanese patent publication JP-A-2005-227177 discloses a tire speed sensor that has a perpendicularly bent body against the axis of the sensor body.

FIGS. 13A and 13B show illustrations of the speed sensor J1 disclosed in the application, and the wire J7 originally extends straight from the sensor body J5 as shown in FIG. 13A. The wire J7 is bent perpendicularly to the axis of the sensor body J5 in FIG. 13B.

The sensor body J5 has a plurality of a convex portions J5a on an outer periphery as shown in FIG. 13A, and an attachment J8 bends the wire J7 perpendicularly against the sensor body J5 when it is disposed on the sensor body J5 as shown in FIG. 13B. Further, the attachment J8 determines an extending direction of the wire J7 around the axis of the sensor body J5 when the attachment J8 is disposed on the sensor body J5 in association with one of a plurality of the convex portion J5a.

In this manner, the speed sensor J1 in the disclosure is designed respectively for use with the right tire and for use with the left tire.

However, the attachment J8 increases the number of parts used to construct the speed sensor J1, and also increases the number of assembly processes and inspection processes to assure fixation of the attachment J8. Further, the attachment J8 is prone to falling-off from the sensor body J5 as well as breakage because of a resistance of the wire J7 against a bending force from the attachment J8. Furthermore, the attachment J8 has to have a certain strength to counter the resistance from the wire J7.

FIGS. 14A and 14B show illustrations of the tire speed sensor J11 having a different structure.

In this case, the wire J13 extends perpendicularly against the axis of the sensor body J12 by using an insert resin molding J14.

However, the insert resin molding J14 increases the number of parts to construct the speed sensor J11, and also adds an assembly process for installing the wire J3 into the insert resin molding J14. Further, the insert resin molding J14 has to be held during a sensor body molding process in order to avoid a defect in molding the sensor body J12 because pressure of molding that tilts the insert resin molding J14 results in an exposure of the insert resin molding J14. Furthermore, tilt of the insert resin molding J14 is prevented by using an insertion anchor pin J16 as shown in FIG. 14B. That is, a hole of the insertion anchor pin J16 left after pulling out the anchor pin J16 has to be mended either by a filling process after the molding or by a heating process in a step for pulling out the anchor pin J16. Therefore, the insert resin molding J14 also results in an increased number of manufacturing processes and a complicated procedure of assembly and the like.

SUMMARY OF THE INVENTION

In view of the above-described and other problems, the present invention provides a rotation detector that maintains a bent portion of wiring in a reliable manner without increasing the number of parts used to construct the detector.

The rotation angle detector of the present invention is produced in a process in the following manner. That is, (1) providing a case-shape housing having a bottom and a side wall having a sensor side position mark formed thereon, (2) housing the IC in the case-shape housing by referencing the sensor side position mark so that the sensor side position mark is arranged in a predetermined positional relationship with an arrangement of the at least two sensors, (3) forming a first resin part of the resin molding, wherein the first resin part in combination with the case-shape housing covers the IC, the IC lead wire and the core wire so that the wiring extends in line with an axis of the sensor body, (4) providing a mold that is capable of changing an arrangement angle of the mold side position mark around the axis of the sensor body in a hollow space for forming the sensor body that includes the mold side position mark, (5) determining the arrangement angle of the mold side position mark around the axis of the sensor body, (6) positioning the first resin part in the hollow space by aligning the sensor side position mark to the mold side position mark, (7) bending the wiring substantially perpendicularly to the sensor body and (8) forming a second resin part of the resin molding by pouring resin into the hollow space defined by the mold, wherein the second resin part includes an outer periphery of the sensor body and a bent portion that fixes the wiring extending from the sensor body, are included in the process.

In this manner, the IC is housed in the case-shape housing by referring to the sensor side position mark so that the sensor side position mark is in a certain positional relationship with the arrangement of the at least two magnetic sensors. Therefore, an angle between the sensor side position mark of the case-shape housing and the wiring extended from the sensor body is determined by aligning the sensor side position mark to the mold side position mark after controlling an angular position of the mold side position mark. As a result, an angle between the extension direction of the wiring and the arrangement of the at least two magnetic sensors can be changed by molding the rotation detector with only one mold. Further, the bent portion of the wiring is fixed by the resin molding having strength and reliability. The increased strength of the bent portion leads to an increased reliability of the rotation detector.

In another aspect of the rotation detector of the present invention, the sensor side position mark and the mold side position mark engage with each other as matching surfaces, matching shape of protrusions or matching shape of depressions.

In yet another aspect of the rotation detector of the present invention, the steps described above are divided into steps in the following. That is, a step for providing a lower mold and a nesting mold, wherein the lower mold provided as a portion of the mold has a through hole that connects an upper surface and a bottom surface of the lower mold and has plural pin receivers arranged radially around the through hole in a predetermined angle, and wherein the nesting mold has a bottom and a side wall that has the mold side position mark and a position pin in a matching shape to the pin receiver, a step for inserting the nesting mold into the through hole of the lower mold having the position pin fitted in one of the plural pin receivers and a step for inserting the case-shape housing and the first resin part into a concave portion defined by the through hole of the lower mold and the bottom of the nesting mold in combination with the side wall thereof in such a manner that the sensor side position mark on the case-shape housing and the mold side position mark on the nesting mold match with each other, are provided.

In this manner, the lower mold controls a placement angle of the mold side position mark by selectively accepting the position pin of the nesting mold in one of the position pin receivers of the lower mold.

In still yet another aspect of the rotation angle detector of the present invention, a step for pressing an upper surface of the first resin part by using a portion of the mold and for guiding the bent portion of the wiring by using the portion of the mold is provided after the step for inserting the case-shape housing and the first resin part into the hollow space. In this manner, the first resin part is prevented from coming off and/or deformation by the resilience of the wiring. In addition, pressure from resin molding is controlled during molding the resin.

In still yet another aspect of the rotation angle detector of the present invention, the first resin part is more securely molding in a predetermined position by pressing an area of the upper surface of the first resin part. In this case, the area of the upper surface of the first resin part pressed by a press block is different from an area pressed by a portion of the mold pressed by the press block.

In still yet another aspect of the rotation angle detector of the present invention, the rotation detectors for use with the right side tire and with the left side tire are preferably produced by the method described above as aspects of the present invention. That is, the rotation detectors for the right side tire and for the left side tire are produced in different shapes by controlling arrangement of the same mold.

In still yet another aspect of the rotation angle detector of the present invention, the rotation detector having a bent portion in the wiring can be produced in a reliable manner in terms of maintenance of the bent portion.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

First Embodiment

Figure 1A:
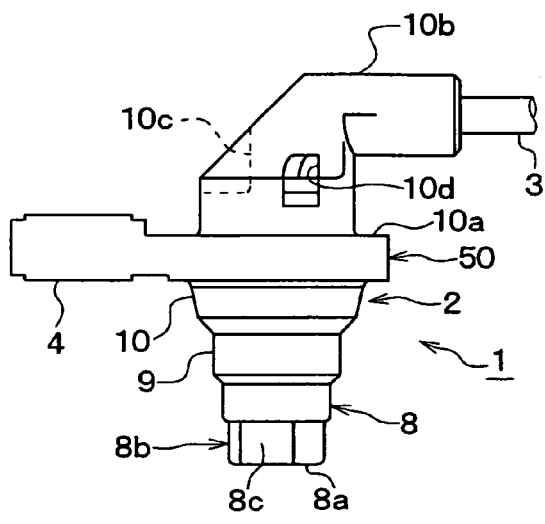
FIG. 1A shows a front view of a rotation detector used with a right side tire in a first embodiment of the present invention.
Figure 1D:
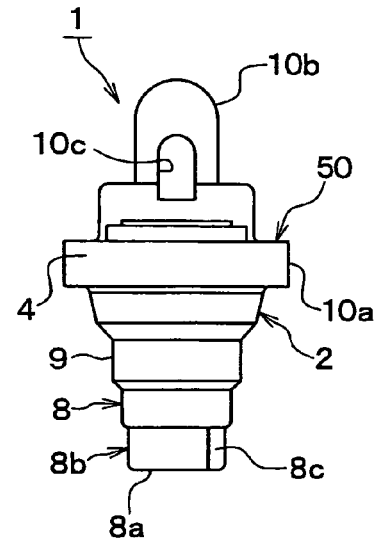
FIG. 1D shows a left side view of a rotation detector used with a right side tire in a first embodiment of the present invention.
Figure 1B:
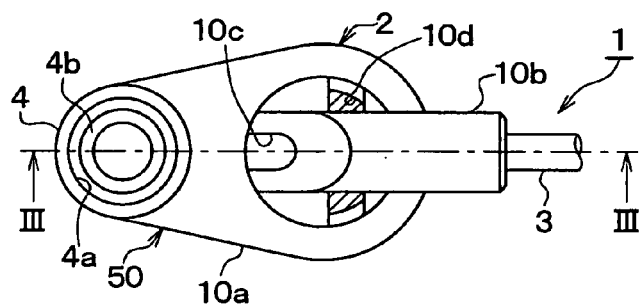
FIG. 1B shows a top view of a rotation detector used with a right side tire in a first embodiment of the present invention.
Figure 1E:
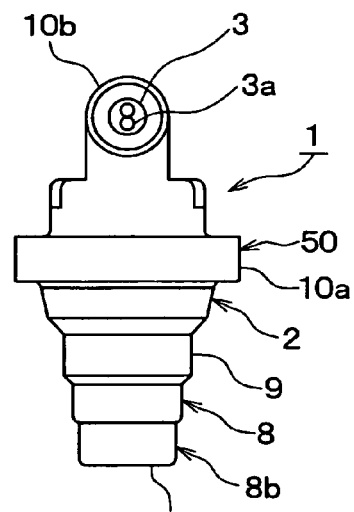
FIG. 1E shows a right side view of a rotation detector used with a right side tire in a first embodiment of the present invention.
Figure 1C:
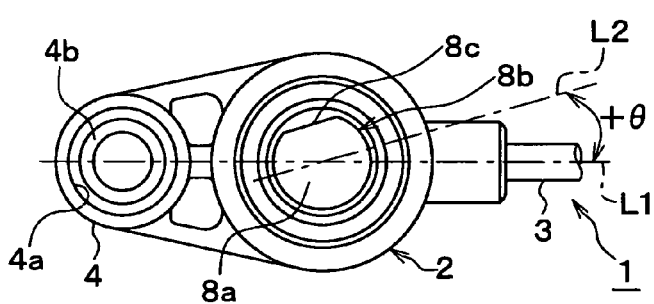
FIG. 1C shows a bottom view of a rotation detector used with a right side tire in a first embodiment of the present invention.
Figure 2A:
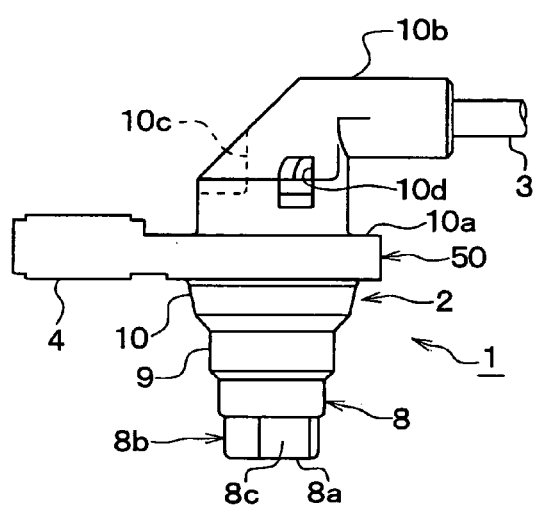
FIG. 2A shows a front view of a rotation detector used with a left side tire in a first embodiment of the present invention.
Figure 2D:
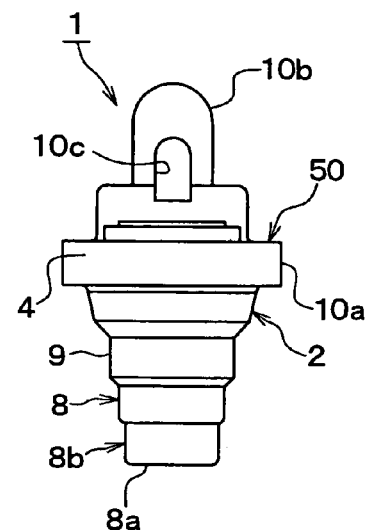
FIG. 2D shows a left side view of a rotation detector used with a left side tire in a first embodiment of the present invention.
Figure 2B:
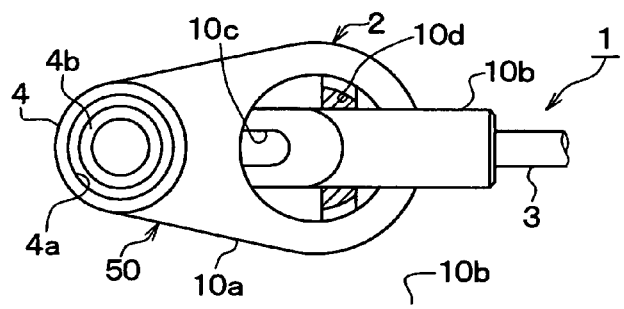
FIG. 2B shows a top view of a rotation detector used with a left side tire in a first embodiment of the present invention.
Figure 2E:
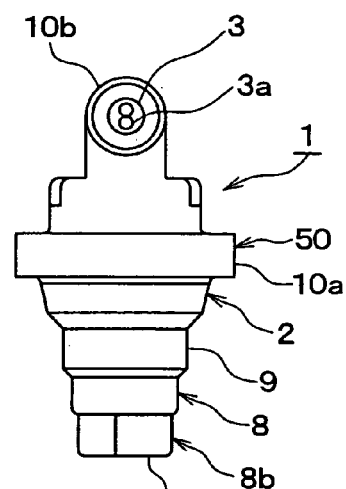
FIG. 2E shows a right side view of a rotation detector used with a left side tire in a first embodiment of the present invention.
Figure 2C:
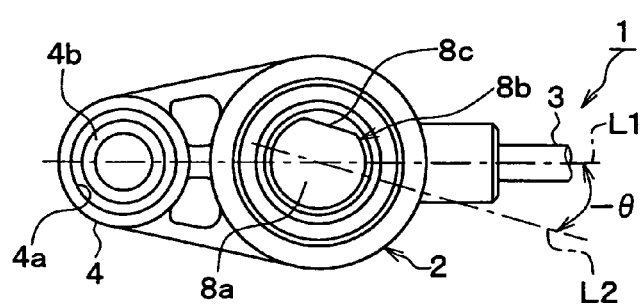
FIG. 2C shows a bottom view of a rotation detector used with a left side tire in a first embodiment of the present invention.

FIGS. 1A to 1E and FIGS. 2A to 2E show illustrations of a rotation detector used as a tire speed sensor 1. That is, FIG. 1 shows a front view of tire speed sensor 1 used with a right side tire in a first embodiment of the present invention, and FIGS. 1B to 1E show a top view, a bottom view, a left side view, and a right side view of the tire speed sensor 1 used with the right side tire in the first embodiment respectively. Likewise, FIG. 2A shows a front view of the tire speed sensor 1 used with a left side tire in the first embodiment of the present invention, and FIGS. 2B to 2E show a top view, a bottom view, a left side view, and a right side view of the tire speed sensor 1 used with the left side tire in the first embodiment respectively.

The tire speed sensor 1 in FIG. 1A has a sensor body 2 in a resin molding 50, and a wiring 3 extends from the sensor body 2 perpendicularly to an axis of the sensor body 2. The sensor body 2 has a stay 4 in a middle position in terms of axial direction of the body 2, and the stay 4 extends in an opposite direction relative to an extension direction of the wiring 3. In this case, the axis of the sensor body 2 is defined as a center line of a portion of the sensor body 2 where an end of the wiring 3 is connected thereto.

Figure 3:
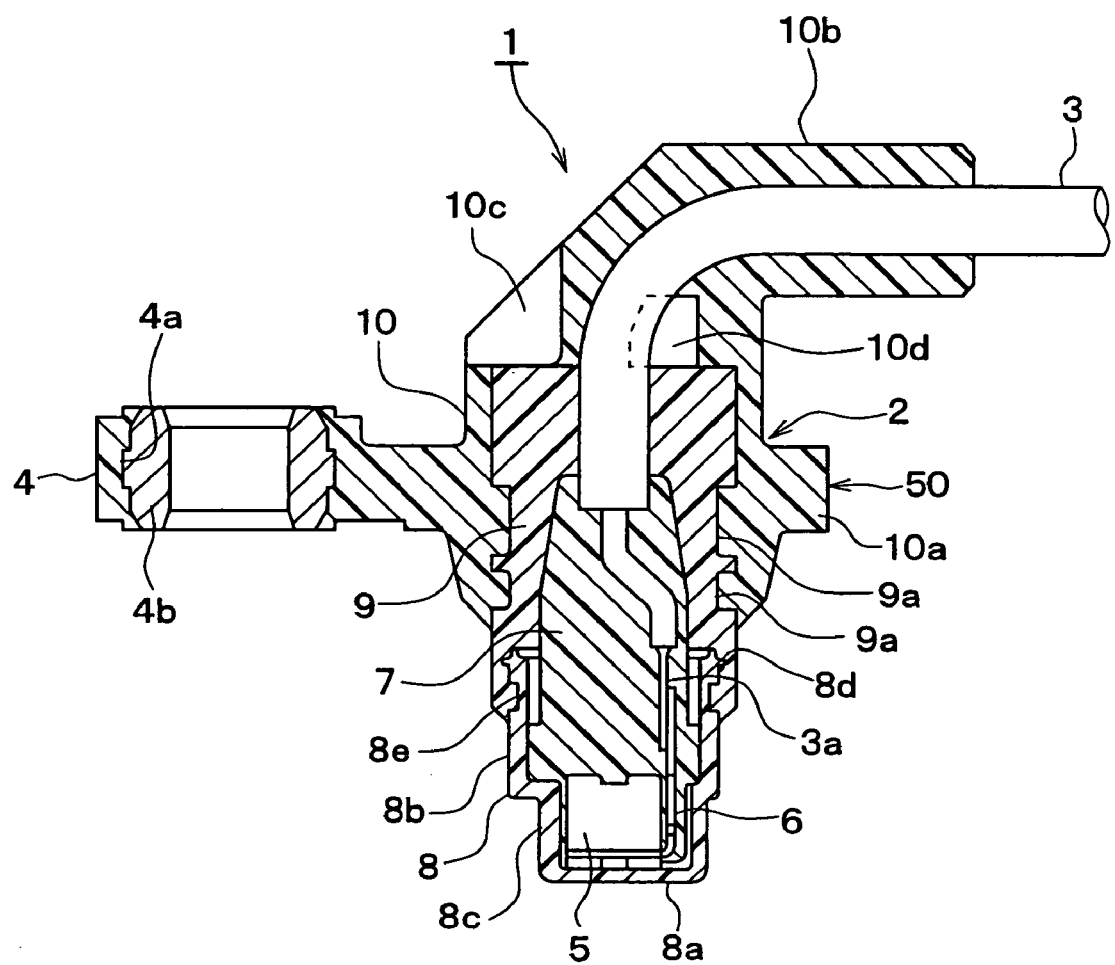
FIG. 3 shows a cross-sectional view of the rotation detector in FIG. 1B along III-III line.

FIG. 3 shows a cross-sectional view of the tire speed sensor 1 in FIG. 1B along III-III line. The sensor body 2 includes two magnetic sensors that has Hall elements for detecting magnetism and a signal process circuit for processing an output signal from the magnetic sensors. The sensor body 2 also includes Hall IC 5 having a magnet for generating magnetism.

The Hall IC 5 includes the magnetic sensor and the process circuit together with the magnet in an integrally formed body. The Hall IC 5 has an IC lead wire 6 for outputting a pulse signal from the process circuit. More practically, the Hall IC 5 substantially has a cubic shape with the two magnetic sensors and the magnet disposed on a bottom side thereof.

The IC lead wire 6 is welded to the end of the wiring 3 where a sheath (an insulation cover) of the wiring 3 is removed. The coupling of the IC lead wire 6 with a core wire 3a of the wiring 3 allows the Hall IC 5 to output the pulse signal to an outside thereof.

The Hall IC 5, the IC lead wire 6 and the end of the wiring 3 are integrally covered with the resin molding 50. Therefore, the tire speed sensor 1 is structured in a form that the sensor body 2 integrally molded with the wiring 3 accepts the end of the wiring 3.

The resin molding 50 includes a resin base 7, a case-shape housing 8, a first resin part 9, and a second resin part 10.

The resin base 7 is a resin component that includes a part of the Hall IC 5, the IC lead wire 6, and a part of the wiring 3 including the core wire 3a for an electrical coupling of the IC lead wire 6 with the core wire 3a. The resin base 7 is accepted by the case-shape housing 8 with a position mark of the Hall IC 5 exposed therefrom.

The case-shape housing 8 houses the Hall IC 5 molded in the resin base 7. The case-shape housing 8 is substantially in a form of a cup to accept the resin base 7. The case-shape housing 8 has a bottom 8a in a flat arc shape and a side wall 8b on a periphery of the bottom 8a. The side wall 8b of the case-shape housing 8 surrounds the resin base 7 when the resin base 7 is accepted therein.

The side wall 8b is in a step shape toward an opening of the case-shape housing 8, and the diameter of an upper part of the case-shape housing 8 is greater than the diameter of a lower part (bottom 8a side). The lower side of the side wall 8a has a flat portion 8c that corresponds to a straight line of the arc shape of the bottom 8a. The Hall IC 5 is positioned in the case-shape housing 8 with the position mark abutted to the flat portion 8c of the side wall 8b and to the bottom 8a for a suitable installation.

The case-shape housing 8 has the bottom 8a opposed to a gear rotor (not shown in either of FIG. 1A or 2A) in a predetermined distance therefrom. In this manner, the Hall IC 5 is positioned in an appropriate distance from the gear rotor.

The case-shape housing 8 has a protrusion 8d disposed on an outside of the side wall 8b in a proximity of the opening. The protrusion 8d is used for adhesion of the case-shape housing 8 to the first resin part 9. The case-shape housing 8 also has a depression 8e disposed on the outside of the side wall 8b next to the protrusion 8d on the bottom 8a side. The depression 8e is used to prevent the case-shape housing 8 from coming off from the first resin part 9.

The first resin part 9 covers the resin base 7 and the proximity of the opening of the case-shape housing 8, i.e., the protrusion 8d on the outside of the housing 8, and also covers an outside of the sheath of the wiring 3. The first resin part 9 seals the resin base 7 and the case-shape housing 8, because a top part of the protrusion 8d melts in a process of molding the first resin part 9 thereonto. The first resin part 9 also seals the sheath of the wiring 3 by using a well-know technique. In this manner, the first resin part 9 prevents water or the like from intruding into an inside thereof. That is, the Hall IC 5, the IC lead wire 6 and the core wire 3a are prevented from intrusion of water or the like.

The depressions 9a disposed on an outside of the first resin part 9 are used to prevent the first resin part 9 from coming off from the second resin part 10.

The second resin part 10 covers the first resin part 9, and, at the same time, perpendicularly bends the wiring 3 extending from the first resin part 9 against an axis of the sensor body 2. In this manner, the second resin part 10 maintains a bent shape of the wiring 3 against the sensor body 2 with increased reliability.

The second resin part 10 includes an outer periphery 10a and a bent portion 10b. The outer periphery 10a covers an outside of the first resin part 9, and the bent portion 10b extends perpendicularly against the axis of the sensor body 2 from an opposite end of the first resin part 9 relative to the case-shape housing 8. The stay 4 is a part of the outer periphery 10a. The stay 4 and an extension direction of the bent portion 10b extends towards opposite directions in an angle of 180 degrees. In this manner, the tire speed sensor 1 does not suffer from interference between the wiring 3 and other parts when the sensor 1 is disposed on a vehicle.

The stay 4 has a hole 4a for fixation on the vehicle by using a bolt. The hole 4a has a collar nut 4b made of a metal for receiving the bolt. The collar nut 4b is disposed in the hole 4a by insert molding.

The second resin part 10 has a hole 10c that exposes an upper surface of the first resin part 9. The hole 10c is disposed on a stay 4 side of the second resin part 10. The second resin part 10 also has a hole 10d on both sides relative to the wiring 3. The holes 10c and 10d are made in the molding process of the second resin part 10 by a mold (a press block) for holding the first resin part 9.

The tire speed sensor 1 has two magnetic sensors in the Hall IC 5 aligned to a line L2, because the flat portion 8c in parallel with the line L2 defines the arrangement of the two sensors. That is, as shown in FIG. 1C, the extension direction of the wiring 3 represented by a line L1 and the arrangement of the two sensors in the Hall IC 5 represented by the line L2 defines an angle +θ (θ in a counterclockwise direction) around the axis of the sensor body 2.

The tire speed sensor 1 shown in FIGS. 2A to 2E has the flat portion 8c in a different angle relative to the extension direction of the wiring 3. Therefore, the arrangement of the two magnetic sensors in the Hall IC 5 relative to the extension direction of the wiring 3 is also different. That is, the line L1 and the line L2 in FIG. 2C defines an angle −θ (θ in a clockwise direction) around the axis of the sensor body 2.

Figure 4A:
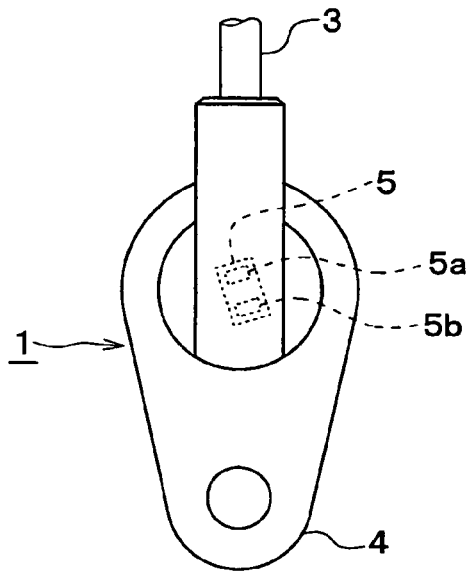
FIG. 4A shows an illustration of position and angle of an IC including magnetic sensors in the rotation detector in FIG. 2A for use with a left tire.
Figure 4B:
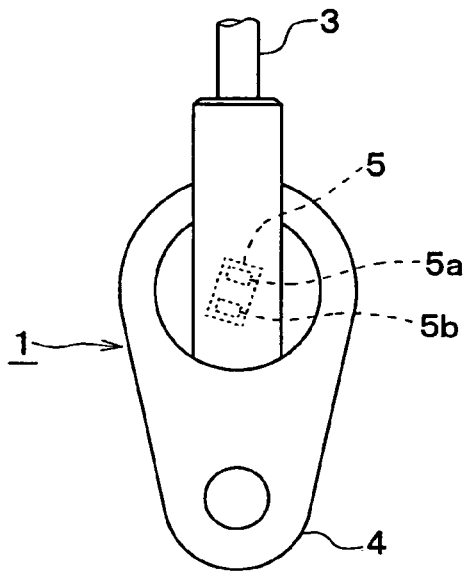
FIG. 4B shows an illustration of position and angle of the IC including magnetic sensors in the rotation detector in FIG. 1A for used with a right tire.
Figure 4C:
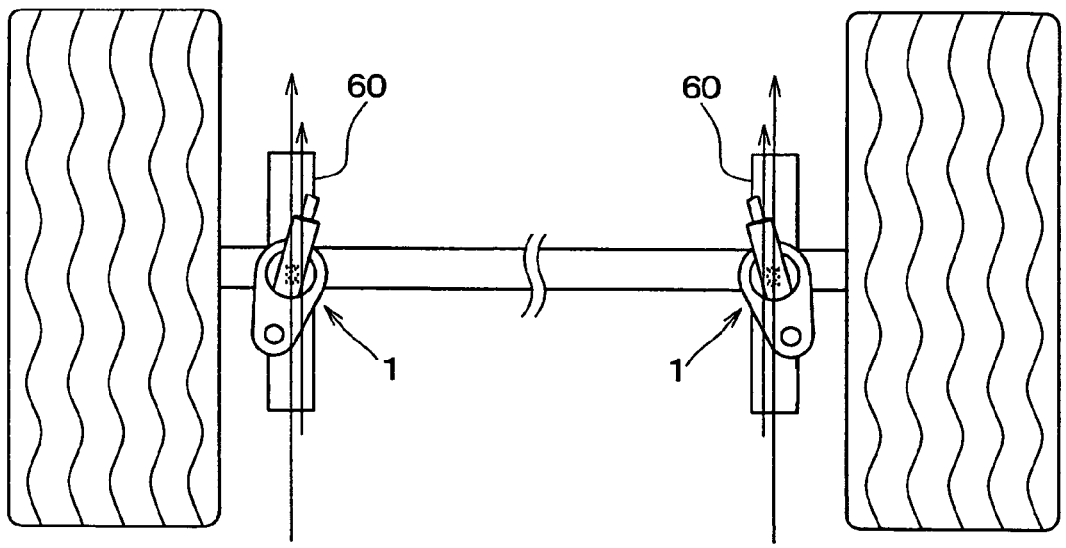
FIG. 4C shows an illustration of the rotation detectors disposed on a vehicle.

Disposition of the tire speed sensors 1 on a vehicle is illustrated by FIGS. 4A, 4B and 4C. FIGS. 4A and 4B show the arrangement of the magnetic sensors 5a, 5b of the Hall ICs 5 in each of the tire speed sensors 1. That is, FIG. 4A shows the tire speed sensor 1 for use with the left side tire previously shown in FIGS. 2A to 2E, and FIG. 4B shows the tire speed sensor 1 for use with the right side tire previously shown in FIGS. 1A to 1E. Further, FIG. 4C shows an illustration of the tire speed sensors 1 in a condition of disposition on a vehicle.

The tire speed sensor 1 has symmetrical arrangement of the magnetic sensors 5a, 5b relative to the extension direction of the wiring 3 in a sensor body for right side use and for left side use as shown in FIGS. 4A and 4B. Therefore, the tire speed sensor 1 disposed on the vehicle has the magnetic sensors 5a, 5b aligned with a direction of rotation of a gear rotor 60. In this manner, the tire speed sensor 1 is put in an actual use with the gear rotor 60 positioned in an appropriate gap amount in terms of tolerance for an assembly error or the like.

In FIGS. 5A to 8C, a manufacturing process of the tire speed sensor 1 is illustrated in detail. Description in the following further explains the details of the manufacturing process.

Figure 5A:
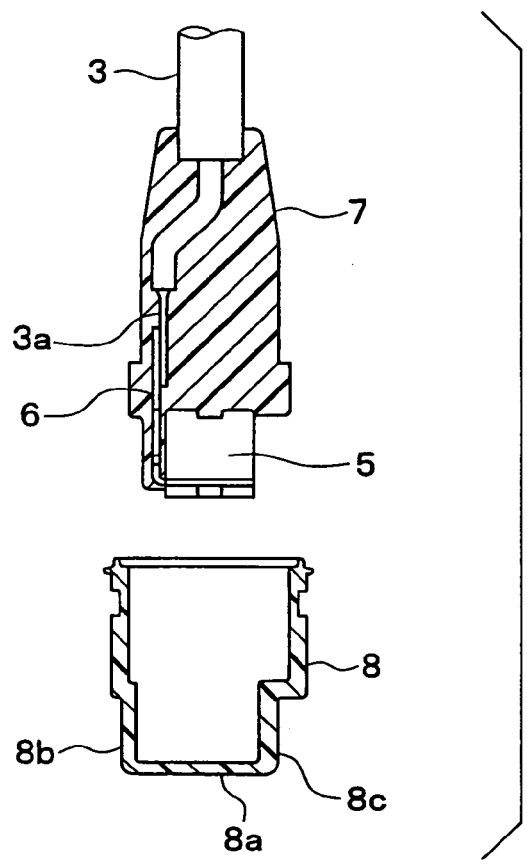
FIGS. 5A and 5B show cross-sectional views of the rotation detector in a manufacturing process.
Figure 5B:
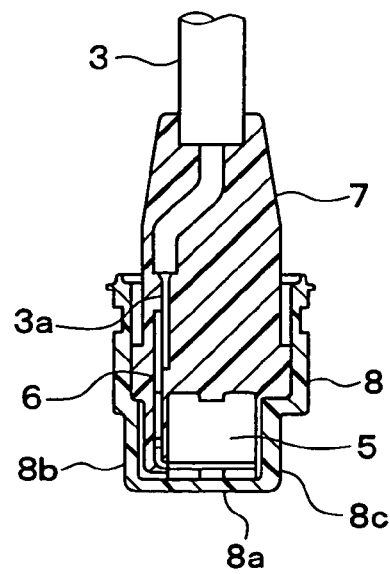

(Process Shown in FIGS. 5A and 5B)

FIGS. 5A and 5B show cross-sectional views of the tire speed sensor 1 as an intermediate product in a manufacturing process. That is, the IC lead wire 6 of the Hall IC 5 is coupled with the core wire 3a of the wiring 3 by welding or the like as shown in FIG. 5A. Then, the IC lead wire 6 and the core wire 3a of the wiring 3 are molded with the Hall IC 5 by using a mold for resin molding. The molded part becomes the resin base 7.

The resin base 7 is housed in the case-shape housing 8 as shown in FIG. 5B. The flat portion 8c of the side wall 8b in the case-shape housing 8 is aligned with the position mark on the Hall IC 5 when the resin base 7 is housed in the housing 8.

Figure 6A:
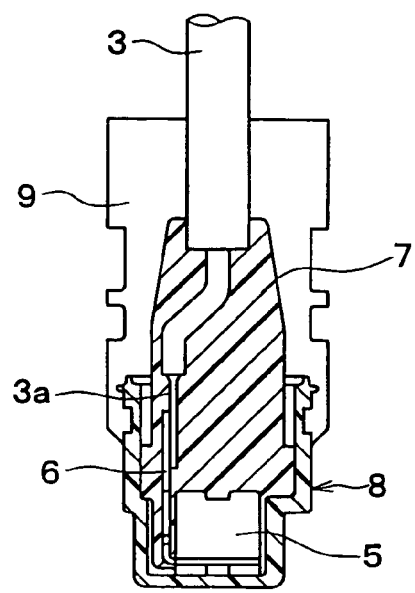
FIG. 6A shows another cross-sectional view of the rotation detector in a manufacturing process.
Figure 6B:
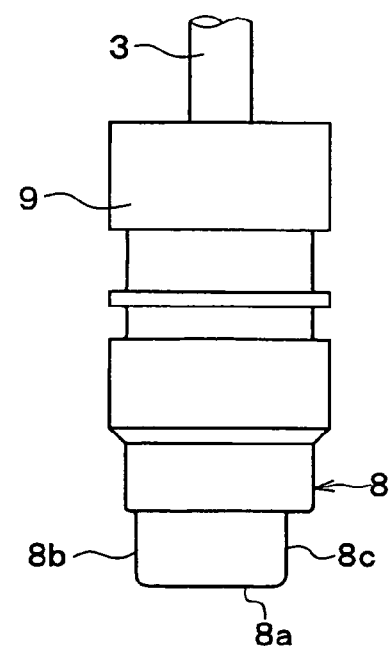
FIG. 6B shows a front view of the rotation detector in a manufacturing process.
Figure 6C:
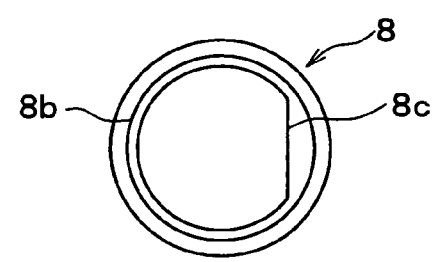
FIG. 6C shows a bottom view of the rotation detector in a manufacturing process.

(Process Shown in FIGS. 6A, 6B and 6C)

The intermediate product of the tire speed sensor 1 in a following step of manufacturing is shown in FIGS. 6A to 6C. That is, FIG. 6A shows the cross-sectional view of the tire speed sensor 1 as the intermediate product in a manufacturing process, and FIGS. 6B and 6C show a front view and a bottom view of the tire speed sensor 1 in the manufacturing process.

The resin base 7 and the case-shape housing 8 are held in a mold for molding the first resin part 9. In this manner, the resin base 7 and an opening side of the case-shape housing 8 are covered by the first resin part 9. More practically, the protrusion 8d on the case-shape housing 8 and an outside of the sheath of the wiring 3 are covered by the first resin part 9 as shown in FIG. 6A.

In this step, the wiring 3 extends along the axis of the sensor body 2. This structure of the tire speed sensor 1 is same for the sensors 1 shown in FIGS. 1A to 1E and in FIGS. 2A to 2E. That is, the tire speed sensor 1 is manufactured in the same manufacturing process up to this point.

(Process Shown in FIGS. 7, 8A, 8B and 8C)

Figure 7:
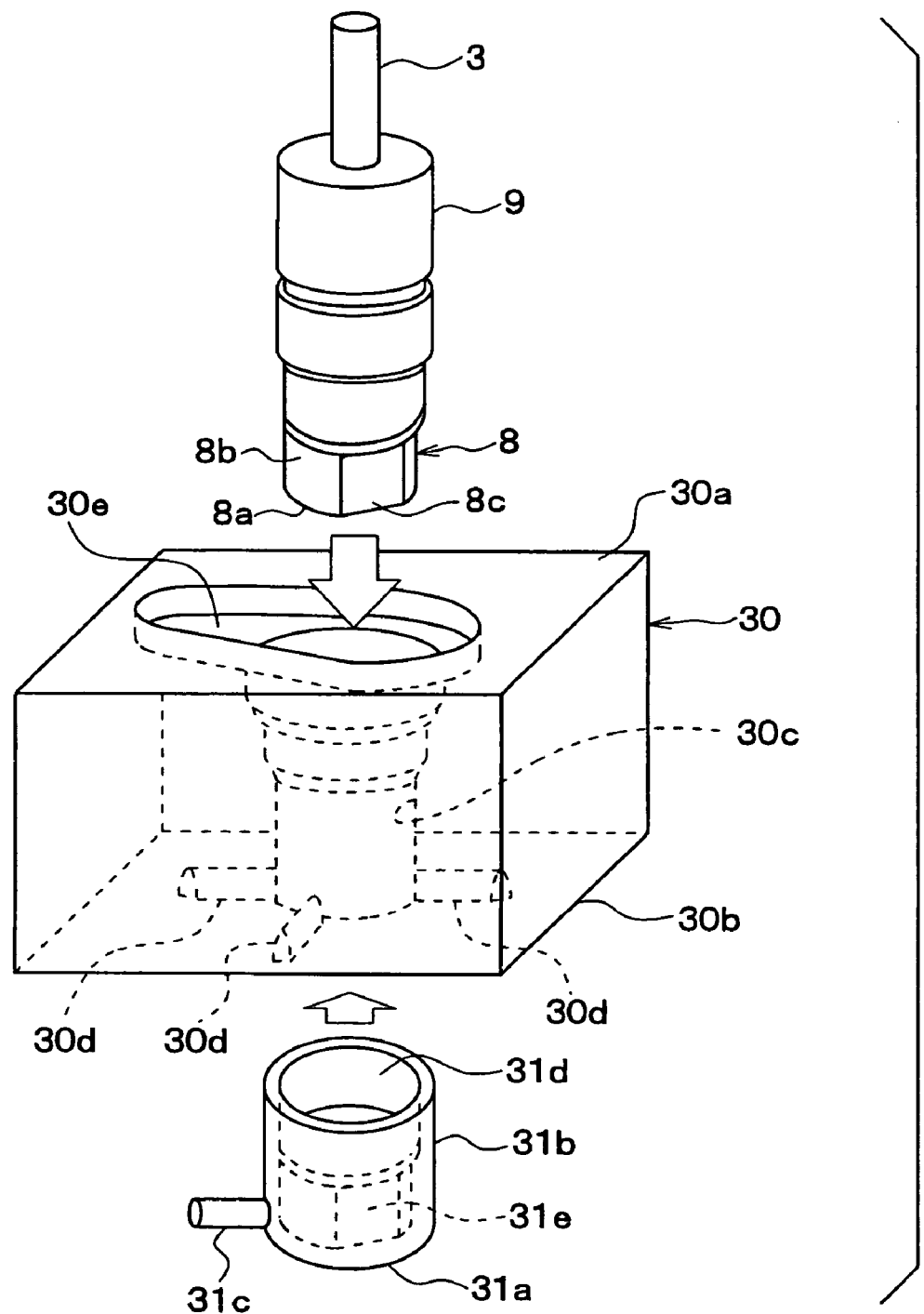
FIG. 7 shows a perspective view of the rotation detector in a step of the manufacturing process.
Figure 8A:
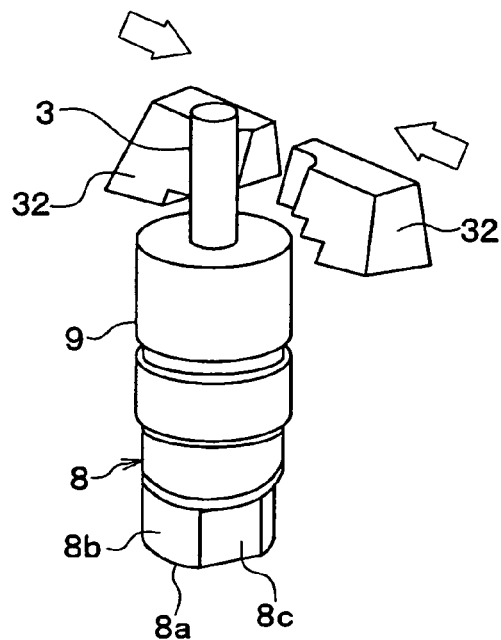
FIGS. 8A to 8C show illustrations of the rotation detector in respective steps of the manufacturing process after the step in FIG. 6A.
Figure 8B:
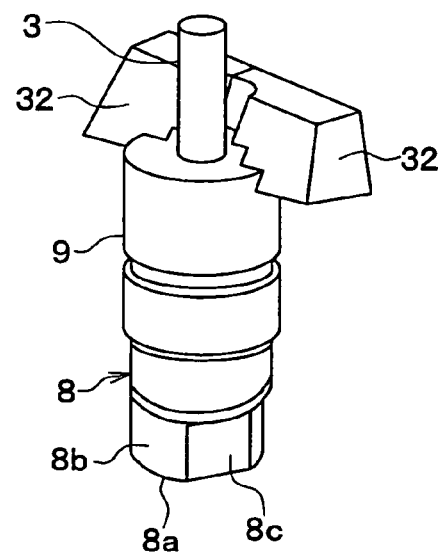
Figure 8C:
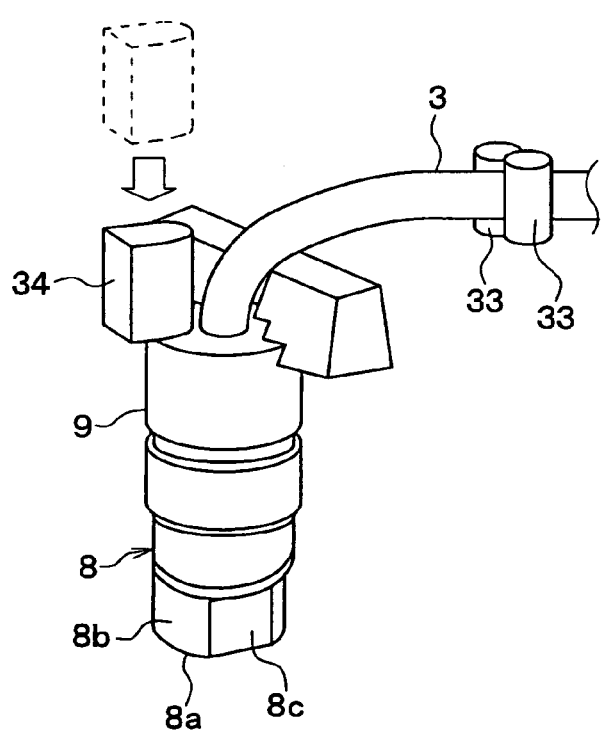
Figure 9A:
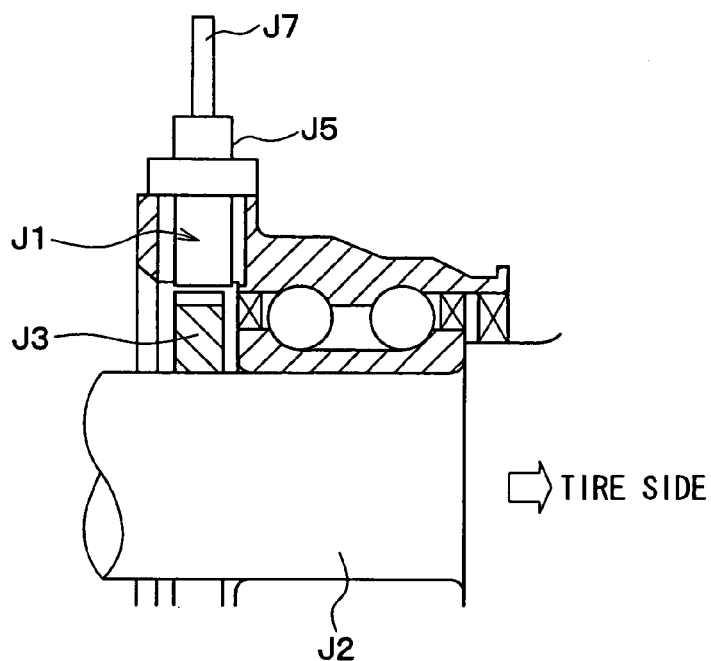
FIGS. 9A and 9B show cross-sectional views of a conventional rotation detector disposed on a vehicle.
Figure 9B:
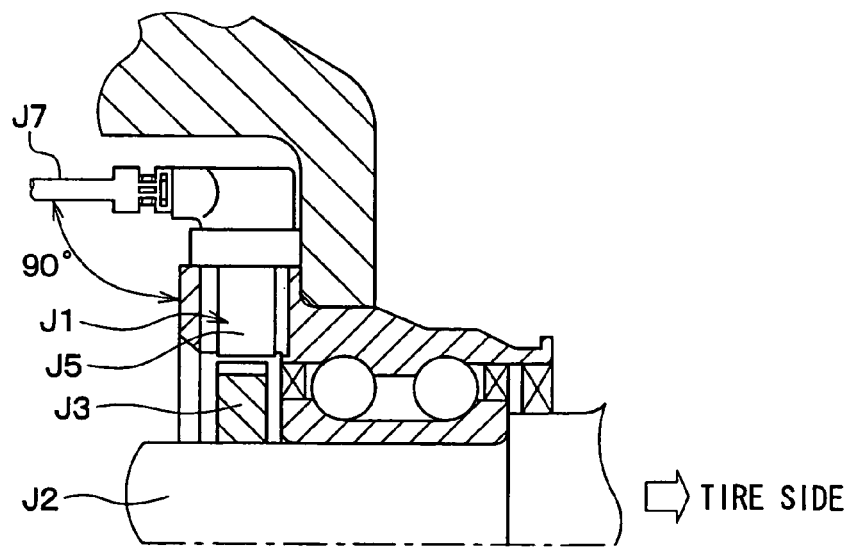
Figure 10A:
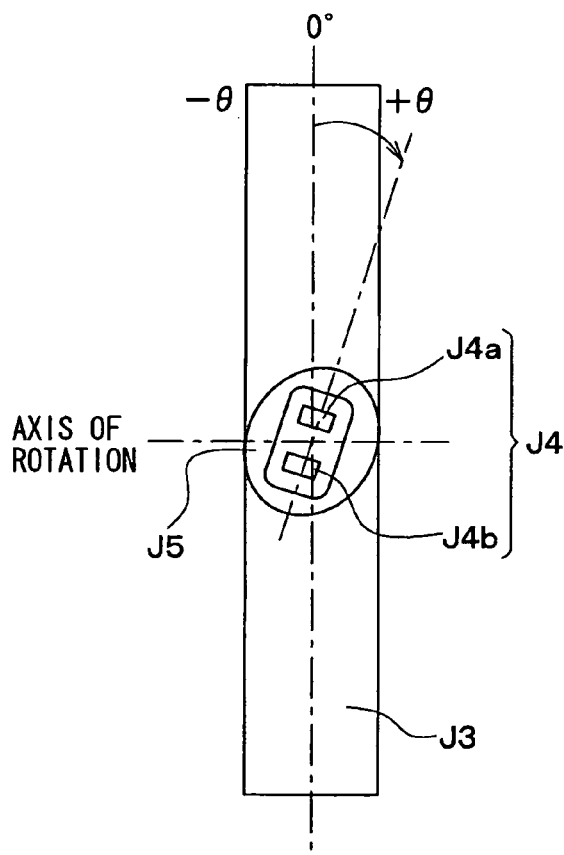
FIG. 10A shows an illustration of positional relationship between a magnetic sensor and a gear rotor.
Figure 10B:
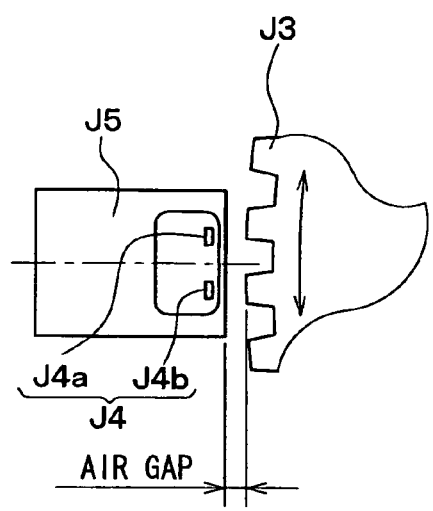
FIG. 10B shows another illustration of positional relationship between a magnetic sensor and a gear rotor.
Figure 11:
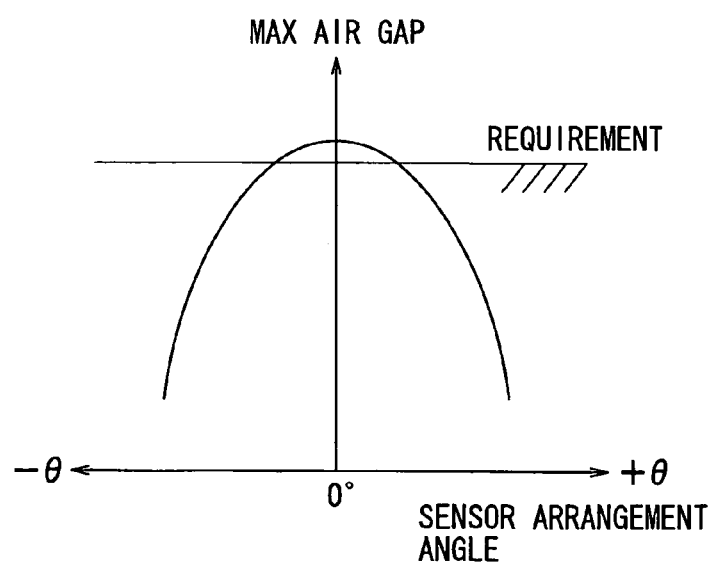
FIG. 11 shows a diagram of relationship between a maximum amount of air gap and an angle of the magnetic sensors against rotation direction of the gear rotor.
Figure 12A:
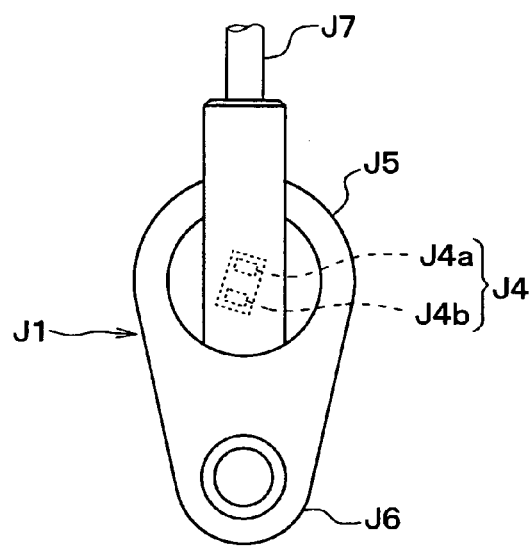
FIG. 12A shows an illustration of a stay relative to a sensor body.
Figure 12B:
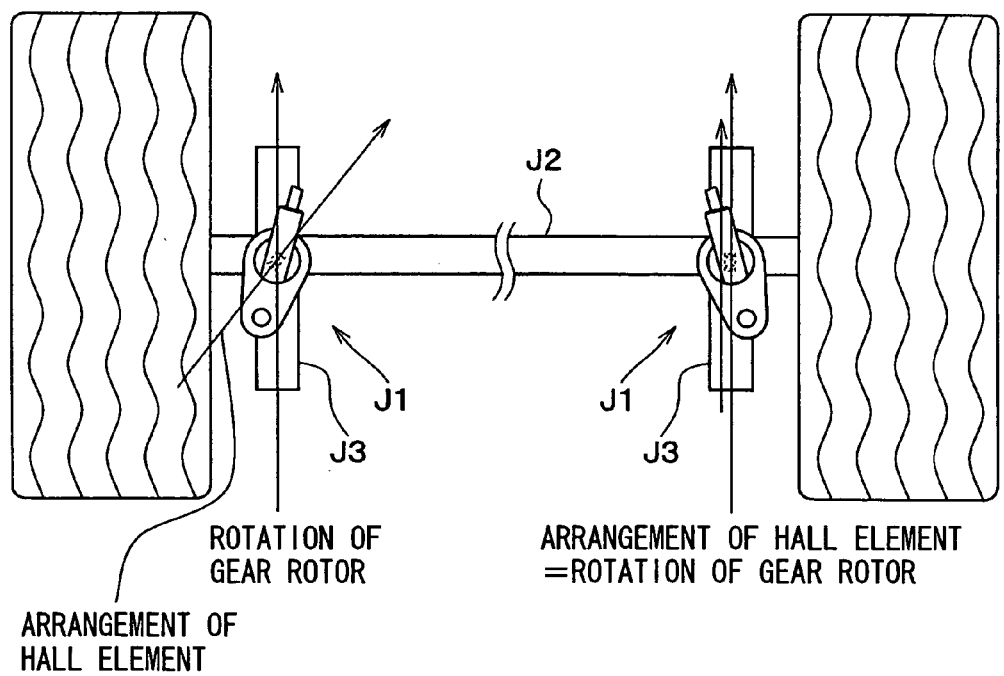
FIG. 12B shows an illustration of the rotation detector in FIG. 12A disposed on a vehicle for use with tires on a right side and a left side.
Figure 13A:
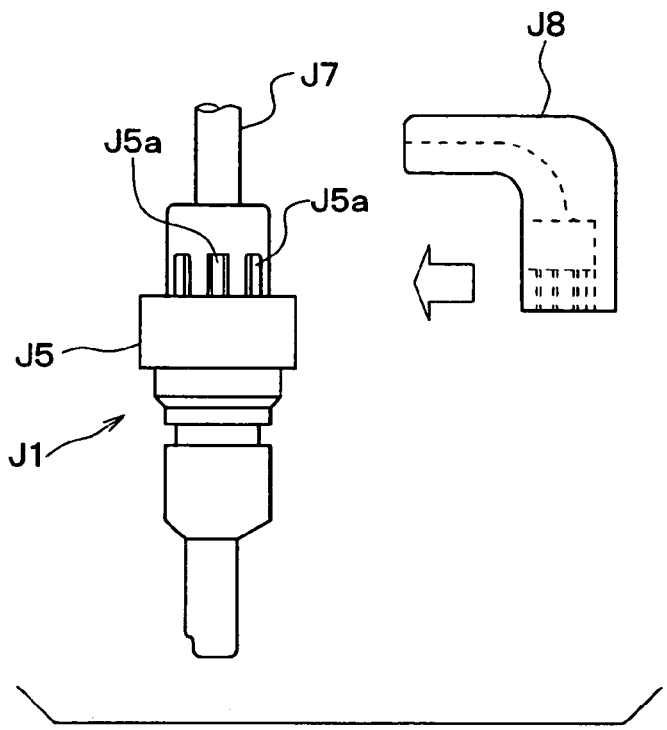
FIG. 13A shows a front view of the conventional rotation detector with a wiring cover removed from the sensor body.
Figure 13B:
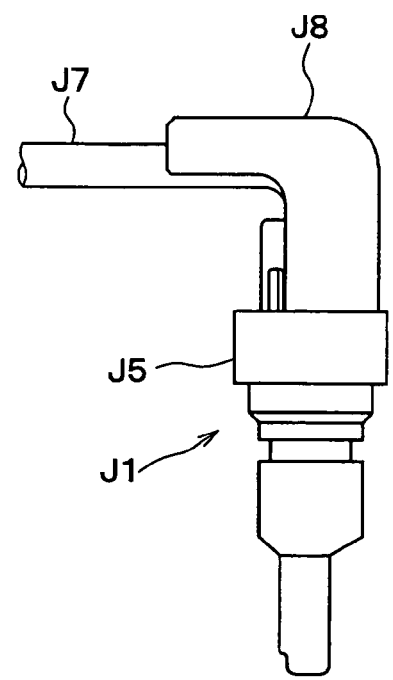
FIG. 13B shows a front view of the conventional rotation detector with a wiring cover attached on the sensor body.
Figure 14A:
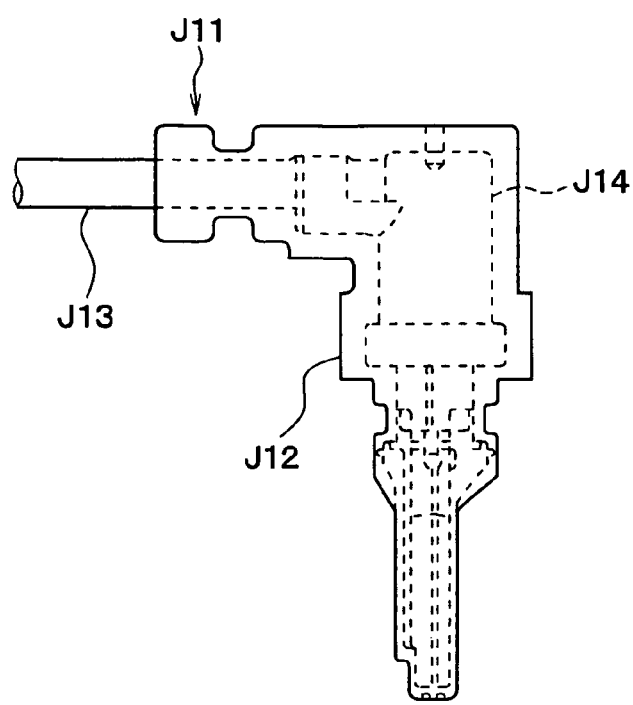
FIG. 14A shows an illustration of another conventional rotation detector.
Figure 14B:
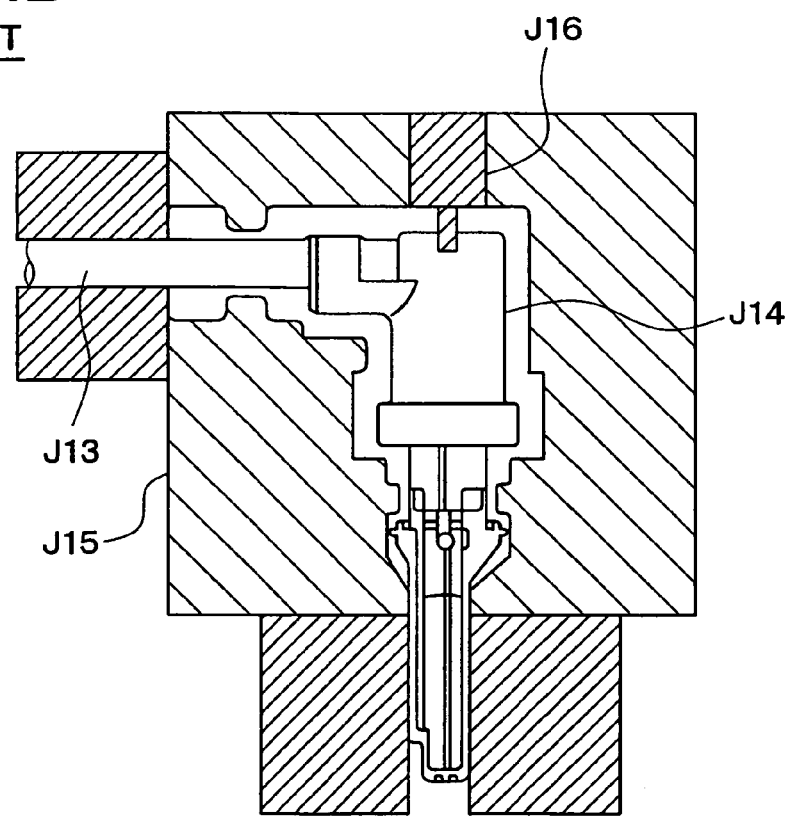
FIG. 14B shows a cross-sectional view of a step in a manufacturing process of the conventional rotation detector in FIG. 14A.

In the illustrations in FIGS. 7, 8A, 8B and 8C, the intermediate product of the tire speed sensor 1 is further molded to have the second resin part 10 disposed thereon. That is, FIG. 7 shows a perspective view of the tire speed sensor 1 in a step of the manufacturing process, and FIGS. 8A to 8C show illustrations of the rotation detector in respective steps of the manufacturing process after the step in FIG. 6A.

A lower mold 30 and a nesting mold 31 for use in the lower mold 30 are provided for molding a portion of the tire speed sensor 1. The molds 30 and 31 are used to form a portion lower than the stay 4 of the tire speed sensor 1.

The lower mold 30 has a cylindrical through hole 30c that connects an upper surface 30a and a bottom surface 30b of the mold 30. The bottom surface 30b has a plurality of pin receivers 30d (e.g., pin shape grooves) that radially extend from the through hole 30c. The pin receivers 30d are arranged in a predetermined angle around the through hole 30c.

The upper surface 30a of the lower mold 30 has a depression 30e for molding the stay 4. The depression 30e extends in a predetermined direction from the through hole 30c. A collar 4b is held in the depression 30e when the stay 4 is molded. In this manner, the direction of the stay 4 and the direction of each of the pin receivers 30d defines a certain angle.

The nesting mold 31 has a bottom 31a and a side wall 31b to form a cup shape. The nesting mold 31 also has a position pin 31c on an outer periphery of the side wall 31b in the proximity of the bottom 31a. The position pin 31c is accepted by one of the pin receivers 30d on the lower mold 30. The nesting mold 31 has a concave portion 31d that is formed in a corresponding shape to the case-shape housing 8. That is, the flat portion 8c of the case-shape housing 8 and a position mark 31e on an inside of the side wall 31b shaped as a flat portion have corresponding shapes.

The nesting mold 31 is inserted into the lower mold 30 from below. The direction of the position pin 31c is aligned with one of the pin receivers 30d. The direction of the position pin 31c is respectively changed for the tire speed sensor 1 in FIG. 1A, and for the tire speed sensor 1 in FIG. 2A.

As a result, the extension direction of the depression 30e and the position mark 31e makes respectively different angles in the tire speed sensor 1 in FIG. 1A and in the tire speed sensor 1 in FIG. 2A.

The intermediate product of the tire speed sensor 1 having the first resin part 9 disposed thereon is inserted into the through hole 30c of the lower mold 30 and the concave portion 31d of the nesting mold 31. In this manner, the flat portion 8c on the side wall 8 and the extension direction of the depression 30e makes respectively different angles in the process for manufacturing the tire speed sensor 1 in FIG. 1A and in the process for manufacturing the tire speed sensor 1 in FIG. 2A.

In a following step, an upper surface of the first resin part 9 is pressed by slide blocks 32. The slide blocks 32 do not cover an entire area of the upper surface of the first resin part 9. That is, the slide blocks 32 cover one side of the upper surface of the first resin part 9 around the wiring 3. Further, the slide blocks 32 have concave portions for guiding the bent portion of the wiring 3.

In a following step, the wiring 3 is nipped by a nipper 33, and is pulled by the nipper 33 in a direction that is opposite to the extension direction of the depression 30e. In this manner, the wiring 3 is bent to have a stable position in the concave portions of the slide blocks 32. In addition, the slide blocks 32 serve as a press block for preventing the first resin part 9 from moving and/or coming off from other part.

In a following step, the upper surface of the first resin part 9 is pressed by a press block 34 of an upper mold at an area that is on an opposite side of the extension direction of the wiring 3. In this manner, movement of the first resin part 9 is securely prevented in a process for molding the second resin part 10 because the upper surface of the first resin part 9 is held by two areas with the slide blocks 32 and the press block 34.

In a following step, the second resin part 10 is molded by using the upper mold (not shown in the figure). A portion above the stay 4 is molded as the second resin part 10 in this manner. The slide blocks 32 and the press block 34 used to hold the upper surface of the first resin part 9 in this step leave holes 10c, 10d in the second resin part 10.

The tire speed sensors 1 shown in FIGS. 1A and 2A can be used respectively with the right side tire and the left side tire because of the arrangement of the magnetic sensors 5a, 5b aligned with the rotation direction of the gear rotors. Both types of the tire speed sensor 1 can be manufactured only by changing the angle of the position pin 30c of the nesting mold 31, that is, by choosing one of the pin receivers 30d on the lower mold 30, when the nesting mold 31 is inserted into the lower mold 30. As a result, the tire speed sensor 1 for the right side tire and the left side tire can be manufactured by using the same mold.

Further, the intermediate product before molding the second resin part 10 can be commonly used for the right and left side tire. Therefore, the manufacturing process of the tire speed sensor 1 is simplified.

Furthermore, the bent portion of the wiring 3 extending perpendicularly from the axis of the sensor body 2 is fixed and maintained securely by the second resin part 10. Therefore, the reliability of the tire speed sensor 1 is improved.

Furthermore, the bent portion of the wiring 3 is molded as a part of the body without using additional parts such as an attachment or the like. Therefore, the number of parts used in the tire speed sensor 1 is reduced.

Other Embodiments

Although the present invention has been fully described in connection with the preferred embodiment thereof with reference to the accompanying drawings, it is to be noted that various changes and modifications will become apparent to those skilled in the art.

For example, (1) the angle between the extension direction of the wiring 3 and the stay 4 may be different from 180 degrees, (2) the arrangement of the magnetic sensors 5a, 5b in the tire speed sensor 1 represented in FIGS. 1A and 2A may not be in reverse directions relative to the extension direction of the wiring 3, (3) the number of the magnetic sensors may be other than two, and (4) the position marks on the sensor side and on the mold side may not necessarily be a flat surface. The sensor side position mark and the mold side position mark may take a protruding shape, a hollow shape or other shapes as long as the position marks on both sides match with each other. The position marks may take any shape as long as the arrangement of the magnetic sensors 5a, 5b can be variably determined relative to the extension direction of the wiring 3 by using only one mold based on the matching shape of the position marks on both of the sensor side and the mold side.

Further, (5) the lower mold 30, the nesting mold 31, the slide blocks 32, the press block 34 may take different shapes and different combinations. For example, the lower mold 30 may be replaced with two separate molds that have a groove for holding the nesting mold from a right side and a left side and a space for accepting the nesting mold 31.

Furthermore, the lower mold 30 may be replaced with a mold for use in a lateral placement.

Furthermore, the through hole 30c may be replaced with a concave portion.

Furthermore, the combination of the position pin 31c and the pin receiver 30d for determining the arrangement angle of the mold side position mark may be replaced with the combination of other shapes. For example, a fitting combination of polygonal shapes may be used for determining the arrangement angle of the mold side position mark around the axis of the sensor body 2.

Furthermore, the slide blocks 32 may be replaced with other types of mold.

Furthermore, (6) the angle between the rotation direction of the gear rotor 60 and the arrangement of the magnetic sensors 5a, 5b may be different from 0 degree. That is, the angle of the sensor arrangement and the rotation of the rotor 60 may be intentionally changed for increasing a signal intensity of the output from the sensors 5a, 5b partly because spacing between the two magnetic sensors 5a, 5b may not be easily changeable for coping with change of gear teeth spacing caused, for example, by use of gear rotors having different diameters.

Such changes and modifications are to be understood as being within the scope of the present invention as defined by the appended claims.

What is claimed is:

1. A method for producing a rotation detector for vehicular use, the rotation detector having a sensor body, a resin molding, a magnet for magnetizing a rotating rotor in a shape of a disk, at least two sensors for generating an output signal upon sensing change in magnetism caused by rotation of the rotor, an IC for processing the output signal from the at least two sensors, an IC lead wire for transferring a pulse signal from the IC, and a wiring covered by a sheath and having a core wire in electrical connection to the IC lead wire, wherein the sensor body is formed by the resin molding that covers the IC, the IC lead wire and a connection portion between the IC lead wire and the core wire, wherein the resin molding includes a resin base, a first resin part and a second resin part, and wherein the wiring extends substantially perpendicularly relative to an axis of the sensor body, the method comprising:

providing a case-shape housing having a bottom and a side wall including a sensor side position mark to house the IC by referring to the sensor side position mark so that the sensor side position mark is arranged in a predetermined positional relationship with an arrangement of the at least two sensors;

forming the first resin part of the resin molding, wherein the first resin part in combination with the ease-shape housing covers the IC, the IC lead wire and the core wire so that the wiring extends in line with an axis of the sensor body;

providing a mold that is capable of changing an arrangement angle of the mold side position mark around the axis of the sensor body in a hollow space for forming the sensor body that includes the mold side position mark, wherein the first resin part is positioned by aligning the sensor side position mark with the mold side position mark in the hollow space after the arrangement angle of the mold side position mark around the axis of the sensor body is determined;

bending the wiring substantially perpendicularly to the sensor body; and forming the second resin part of the resin molding by pouring resin into the hollow space defined by the mold, wherein the second resin part includes an outer periphery of the sensor body and a bent portion that fixes the wiring extending from the sensor body.

2. The method for producing a rotation detector as in claim 1, wherein the sensor side position mark and the mold side position mark are respectively shaped as one of matching surface, matching protrusion and matching depression.

3. The method for producing a rotation detector as in claim 1, a portion of the method for providing the mold further comprising:

providing a lower mold and a nesting mold, wherein the lower mold provided as a portion of the mold has a through hole that connects an upper surface and a bottom surface of the lower mold and has plural pin receivers arranged radially around the through hole in a predetermined angle, and wherein the nesting mold has a bottom and a side wall that has the mold side position mark and a position pin, having a matching shape to the pin receiver;

inserting the nesting mold into the through hole of the lower mold having the position pin fitted in one of the plural pin receivers; and inserting the case-shape housing and the first resin part into a concave portion defined by the through hole of the lower mold and the bottom of the nesting mold in combination with the side wall in such a manner that the sensor side position mark on the case-shape housing and the mold side position mark on the nesting mold match with each other.

4. The method for producing a rotation detector as in claim 3 further comprising:

providing a depression extending from the through hole in a predetermined direction on the upper surface of the lower mold; and forming a stay that extends from the sensor body for installation thereof by using the depression.

5. The method fir producing a rotation detector as in claim 1, wherein pressing an upper surface of the first resin part by using a portion of the mold and guiding the bent portion of the wiring by using the portion of the mold are provided after inserting the case-shape housing and the first resin part into the hollow space.

6. The method for producing a rotation detector as in claim 5, wherein
   pressing the upper surface of the first resin part by using a press block is provided after inserting the case-shape housing and the first resin part into the hollow space, and
   an area of the upper surface of the first resin part pressed by the press block is different from an area pressed by the portion of the mold.

7. The method for producing a rotation detector as in claim 1, wherein
   the rotation detector is used as a right side tire speed sensor of a vehicle and a left side tire speed sensor of a vehicle, and
   the mold side position mark on the right side tire speed sensor and the mold side position mark on the left side tire speed sensor are positioned in different angles respectively so that the sensor side position mark on the right side tire speed sensor and the sensor side position mark on the left side tire speed sensor are respectively positioned in different angles relative to an extending direction of the wiring when the tire speed sensor produced.

8. A rotation detector for vehicular use comprising:
   a sensor body;
   a resin molding;
   a magnet for magnetizing a rotating rotor in a shape of a disk;
   at least two sensors for generating an output signal upon sensing change in magnetism caused by rotation of the rotor;
   an IC for processing the output signal from the at least two sensors;
   an IC lead wire for transferring a pulse signal from the IC; and
   a wiring covered by a sheath and having a core wire in electrical connection to the IC lead wire, wherein
   the resin molding covers the IC, the IC lead wire and a connection portion between the IC lead wire and the core wire to form a cylindrical shape of the sensor body,
   the wiring extends substantially perpendicularly relative to an axis of the sensor body,
   the resin molding has a case-shaped housing having a bottom and a side wall that includes a sensor side position mark formed thereon,
   the resin molding has a resin base that forms an external form of the sensor body together with the case-shaped housing,
   the resin base has a peripheral portion that forms an outer periphery of the sensor body and a bent portion that covers a part of the wiring that extends substantially perpendicularly relative to the axis of the sensor body,
   the IC is housed in the case-shape housing by referencing to the sensor side position mark,
   the sensor side position mark is positioned in a predetermined manner relative to an arrangement of the at least two sensors,
   the wiring is embedded in the bent portion,
   the bent portion bends the wiring so that the wiring extends in a predetermined direction relative to the sensor side position mark,
   the resin base has a stay for installation,
   the resin base includes a first resin part that covers the IC, the IC lead wire and a connection portion between the IC lead wire and the core wire in combination with the case-shaped housing,
   the resin base includes a second resin portion that forms the external form of the sensor body including the stay and the bent portion in a covering shape over the first resin part, and
   the second resin part has a hole that exposes an upper surface of the first resin part.

9. A rotation detector for vehicular use comprising:
   a sensor body;
   a resin molding;
   a magnet for magnetizing a rotating rotor in a shape of a disk;
   at least two sensors far generating an output signal upon sensing change in magnetism caused by rotation of the rotor;
   an IC for processing the output signal from the at least two sensors;
   an IC lead wire for transferring a pulse signal from the IC; and
   a wiring covered by a sheath and having a core wire in electrical connection to the IC lead wire, wherein
   the resin molding covers the IC, the IC lead wire and a connection portion between the IC lead wire and the core wire to form a cylindrical shape of the sensor body,
   the wiring extends substantially perpendicularly relative to an axis of the sensor body,
   the resin molding has a case-shaped housing having a bottom and a side wall that includes a sensor side position mark formed thereon,
   the resin molding has a resin base that forms an external form of the sensor body together with the case-shaped housing,
   the resin base has a peripheral portion that forms an outer periphery of the sensor body and a bent portion that covers a part of the wiring that extends substantially perpendicularly relative to the axis of the sensor body,
   the IC is housed in the case-shape housing by referencing to the sensor side position mark,
   the sensor side position mark is positioned in a predetermined manner relative to an arrangement of the at least two sensors,
   the wiring is embedded in the bent portion,
   the bent portion bends the wiring so that the wiring extends in a predetermined direction relative to the sensor side position mark,
   the rotation detector is used as a tire speed sensor disposed on each of a right side tire and a left side tire of a vehicle, and
   the sensor side position mark of the tire speed sensor on the right side tire and the sensor side position mark of the tire speed sensor on the left side tire are respectively positioned in different angles relative to an extension direction of the wiring.

* * * * *